(12) United States Patent
Dunton

(10) Patent No.: US 6,609,188 B1
(45) Date of Patent: Aug. 19, 2003

(54) DATA FLOW PROCESSOR

(75) Inventor: Randy R. Dunton, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/540,196

(22) Filed: Mar. 31, 2000

(51) Int. Cl.⁷ .................................................. G06F 9/38
(52) U.S. Cl. ............................ 712/18; 712/35; 348/721
(58) Field of Search ............................ 712/18, 25, 35; 345/502, 503, 504, 505, 506; 348/721

(56) References Cited

U.S. PATENT DOCUMENTS

| | | | | |
|---|---|---|---|---|
| 5,590,349 A | * | 12/1996 | Robinson et al. | 712/36 |
| 5,790,817 A | * | 8/1998 | Asghar et al. | 710/311 |
| 5,797,043 A | * | 8/1998 | Lewis et al. | 710/56 |
| 6,012,136 A | * | 1/2000 | Brown | 712/35 |
| 6,085,314 A | * | 7/2000 | Asghar et al. | 712/213 |
| 6,151,069 A | * | 11/2000 | Dunton et al. | 348/220.1 |
| 6,275,891 B1 | * | 8/2001 | Dao et al. | 710/317 |
| 6,441,860 B1 | * | 8/2002 | Yamaguchi et al. | 348/555 |

* cited by examiner

*Primary Examiner*—William M. Treat
(74) *Attorney, Agent, or Firm*—Trop, Pruner & Hu, P.C.

(57) ABSTRACT

A data flow processor includes a number of hardware units each having more than one mode. A plurality of hardware units may be connected together to implement a flow made up of a series of processes. The flows, initiated by a central processing unit, may proceed independently and substantially at their own pace. Thus, the flows may operate in parallel, independently with respect to one another. Each of the hardware units may be configured differently to operate with each of the different flows.

25 Claims, 7 Drawing Sheets

DATA FLOW PROCESSOR

BACKGROUND

This invention relates generally to digital signal and graphics processors.

A digital signal processor generally modifies or analyzes information measured as a discrete sequence of numbers. Digital signal processors are utilized for a wide variety of signal processing applications such as television, multimedia, audio, digital imaging processing and telephony as examples. Most of these applications involve a certain amount of mathematical manipulation, usually multiplying and adding signals.

A large number of digital signal processors are available from a large number of vendors. Generally, each of these processors is fixed in the sense that it comes with certain capabilities. The users attempt to acquire those processors which best fit their needs and budget. However, the user's ability to modify the overall architecture of the digital signal processor is relatively limited. Thus, these products are packaged as units having generally fixed and immutable sets of capabilities.

In a number of cases, it would be desirable to have the ability to create a digital signal processor that performs complex functions that are specifically adapted to particular problems to be solved. Thus, it would be desirable that the hardware or software of the digital signal processor be adaptable to a particular function. However, such a digital signal processor might enjoy relatively limited market. Given the investment in silicon processing, it may not be feasible to provide the digital signal processor that has been designed to meet relatively specific needs. However, such a device would be highly desirable. It would provide the greatest performance for the expense incurred, since only those features that are needed are provided. Moreover, those features may be provided that result in the highest performance without unduly increasing costs.

Processor speed has increased dramatically over the last few years. However, the ability of memories to keep track with high speed processors has lagged. One way to get around this problem is to use caches. However, caches do not work well when the data is usually different. Thus, systems that work with data intense operations generally do not scale in speed with improving processor speed.

In addition, many processing devices access memory at a high frequency. Each time memory is accessed, the system processing time is decreased. Moreover, memory accesses commonly result in power consumption. In some battery operated systems, it would be desirable to reduce power consumption. Therefore, it would be desirable to find a way to reduce the number of memory accesses in the course of a processing routine.

Thus, there is a need for a processor that is readily adaptable to handling a variety of intense data manipulation operations.

DETAILED DESCRIPTION

Figure 1:
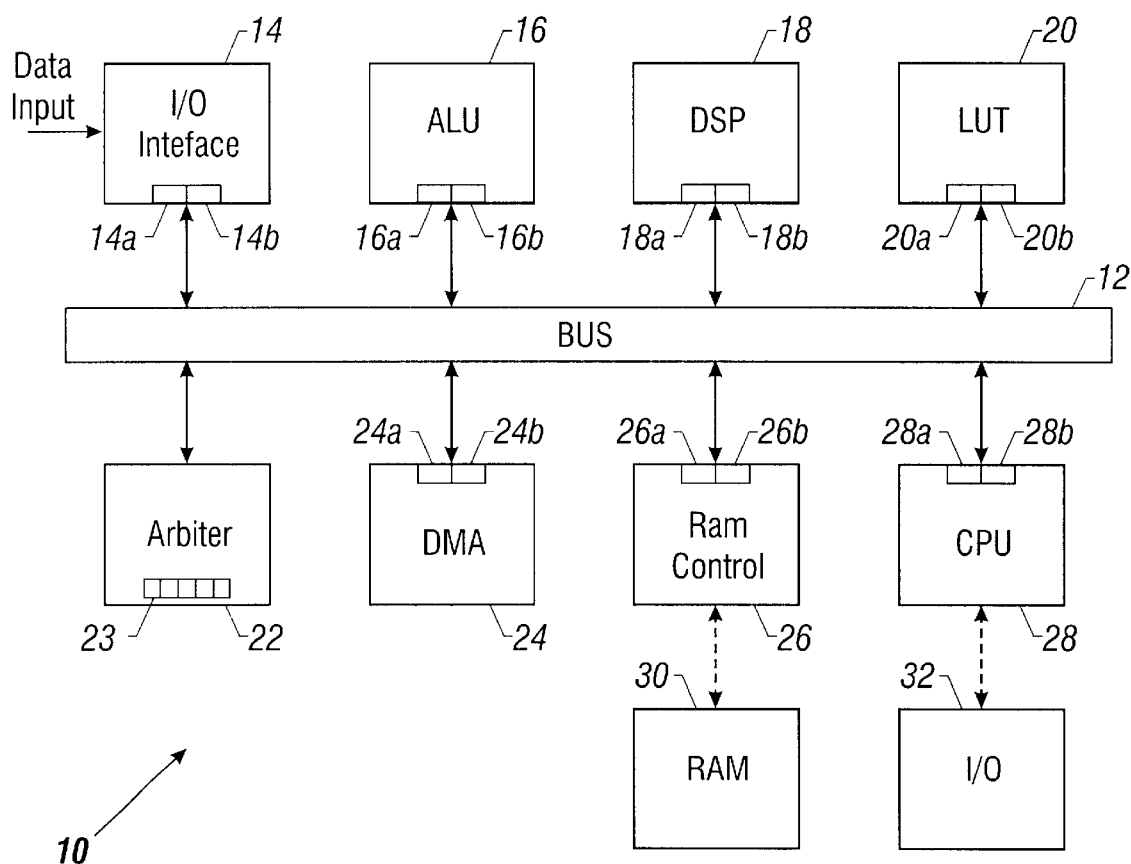
FIG. 1 is a block diagram of one embodiment of the present invention.

Referring to FIG. 1, a digital signal processor (DSP) 10 may include a bus 12 that couples a number of hardware units 14–28. A data input may be received by input/output (I/O) interface 14. The interface 14 is coupled to the bus 12 through receiving first in first out (FIFO) registers 14a and transmitting FIFO registers 14b.

An arithmetic logic unit 16 is coupled to the bus 12 through receiving FIFO registers 16a and transmitting FIFO registers 16b. One or more DSP engines 18 may be coupled to the bus 12 through a receiving FIFO register 18a and a transmitting FIFO register 18b. In addition, specialized DSP engines such as a lookup table 20 may be coupled to the bus 12 through FIFO registers 20a and 20b. A bus arbiter 22 may be coupled to the bus 12 through a simple request/grant signal pair, operating over a request grant bus that is part of the bus 12. The arbiter 22 may include a register 23 that stores bus access priorities.

A direct memory access (DMA) engine 24 is coupled to the bus 12 through receiving and transmitting FIFO registers 24a and 24b. Address, data pairs may be sent as packets over the same bus 12 that carries other data, with the DMA engine 24 having the highest priority in one embodiment of the invention. A random access memory (RAM) controller 26 is coupled to the bus 12 through receiving and transmitting FIFO registers 26a and 26b. The RAM controller 26 is also coupled to an external RAM memory 30. In one embodiment of the present invention, the RAM 30 may be dynamic random access memory.

Finally, a general purpose central processing unit (CPU) 28 may be coupled to the bus 12 through receiving FIFO registers 28a and transmitting FIFO registers 28b. The CPU 28 may be coupled to input/output devices or peripherals 32 to enable user interfaces with the DSP 10.

The CPU 28 manages certain DSP 10 tasks. For example, it may handle interrupts, manage the system and may be responsible for initial set up of the various hardware units 14–26. Thus, the CPU 28 may not control the step by step execution of the process steps implemented by the various hardware units making up the rest of the DSP 10. Instead, during digital signal processing it may be responsible for more limited applications in the sense of a service provider to the remaining hardware units which actually provide the functional results of the DSP 10. For example, the CPU 28 may perform complex logic tasks such as operating a real time operating system (RTOS), implementing file management, and providing user interfaces. In some cases, the CPU 28 may help or substitute for other hardware units 14–26 as the need arises.

The DSP 10 utilizes a data flow architecture in which a plurality of parallel data flows progress through various units 14–20 relatively independently of any central control from the CPU 28 or any other central resource. In fact, the units 14–20 may perform their operations on data without the use of a central memory resource in the course of data flow processing. At the end of any given data flow, information may be written to an external memory and at the initiation of a data flow, data may read from an external memory. However, in the course of any given data flow, there may be no need to transmit addresses since generally the data moves with the data flow.

In general, decoupling the processing operations from the need for frequent memory accesses may greatly increase processing speed, simplify processing operations, and in some cases reduce power consumption. In addition, by reducing the number of memory accesses in the course of a processing operation, it may be possible to structure the memory addresses in different configurations. For example, memory address may be arranged in two or three dimensional spaces. For example, in connection with imaging arrays, it may be advantageous to manipulate addresses in two dimensions which correspond to the x and y pixels of the imaging array. Similarly, in dealing with complex three dimensional shapes, it may be advantageous to utilize memory addresses in three dimensions. Conventional memories operate in one dimensional memory spaces. However, in systems with limited memory accesses, the one dimensional data from the memory may be converted into a more than one dimension space. The data may utilize a multi-dimensional array, and then the results data may be converted for storage in a one dimensional memory thereafter. In many processing systems of conventional design the use of multi-dimensional data is not feasible because the numerous memory accesses would require constant conversion between one and multi-dimensional memory spaces.

Each of the hardware units 14–20 and any modules contained within those units may have a plurality of modes. Each of these modes may be used in different flows at different times. Thus, the same hardware unit or module may act differently in different modes. The modes may be selected through information precoded into the units by the CPU 28 in a set up stage in one embodiment of the invention. Thus, a hardware unit may be adapted to accomplish a variety of different functional variations on a central operating theme. No central synchronization may be required. Instead, the data flows may progress through one or more hardware units at a rate determined by those particular hardware units and the manipulations they perform. When more than one data flow must come together to create a result, the faster data flow may wait for the slower data flow to arrive.

Each of the hardware units or modules in the DSP 10 may be re-programmable. Even when those units or modules have a variety of programmable modes for one application, they may be reprogrammed with other modes for new applications.

The nature of the hardware units used in any given DSP implementation is subject to wide variability. The units shown in FIG. 1 constitute one potential set of units adapted for image processing applications, for example.

Figure 2:
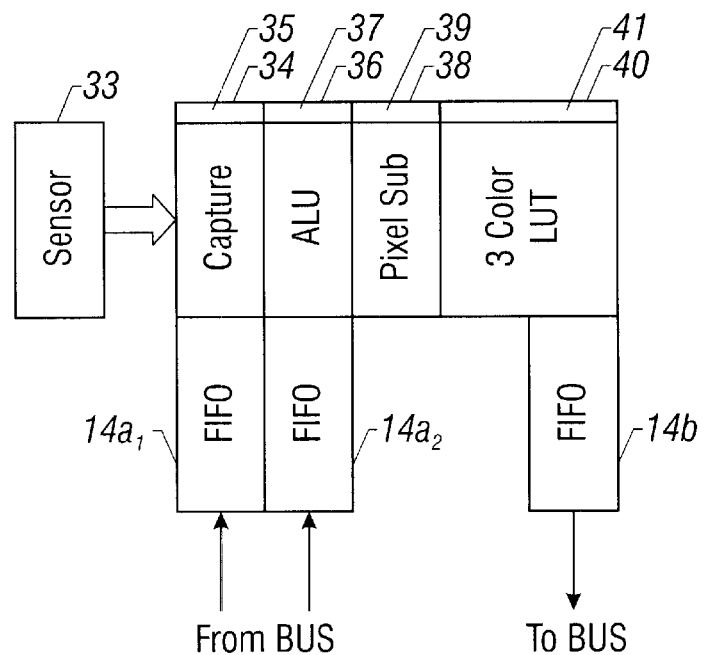
FIG. 2 is a block diagram of the I/O interface shown in FIG. 1 in accordance with one embodiment of the present invention.

Referring to FIG. 2, in one embodiment of the present invention the interface 14 may receive input data from a sensor 33. The sensor 33 may be an imaging array as one example. Alternatively, the interface 14 may receive input information through FIFO registers 14a1 or 14a2 coupled to the bus 12. The input data from the sensor 33 initially goes to a capture module 34. The capture module 34 may perform discrete functions such as sensor control and timing. The capture module 34 is coupled to ALU module 36, a pixel substitution module 38 and a three color look up table module 40. An output or transmit FIFO 14b may also be coupled to the bus 12. Thus, the input/output interface 14 may perform complex functions associated with the capture of video data in one embodiment of the present invention.

As shown in FIG. 2, each of the modules 34, 36, 38 and 40 also includes a command register 35, 37, 39 and 41. During an initial setup mode, the CPU 28 programs each of these registers with information about the way a particular module is to operate. For example, the CPU may set the bits in these registers to determine the mode of operation of each module 34 to 40.

Figure 3:
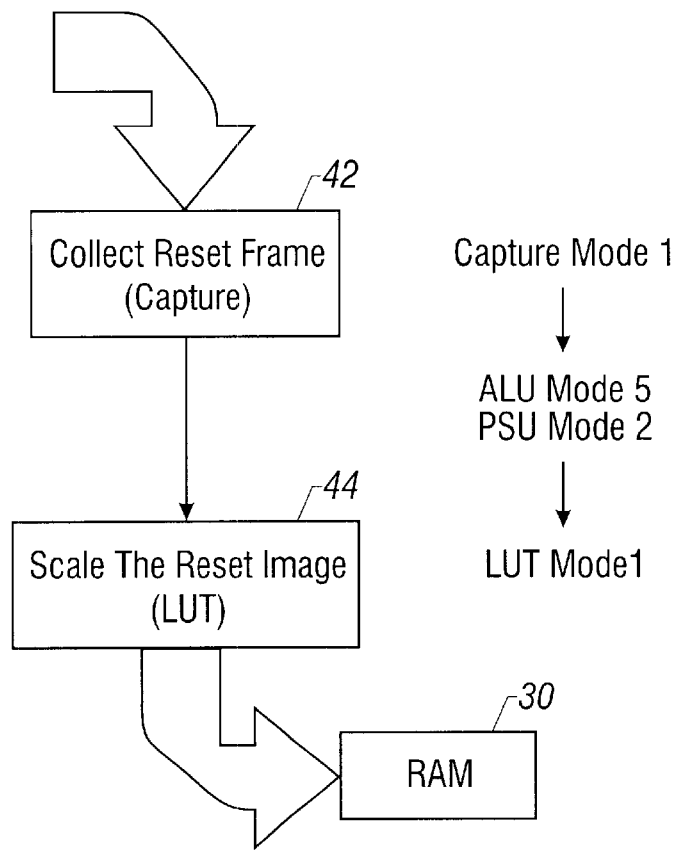
FIG. 3 is a schematic depiction of a data flow in accordance with one embodiment of the present invention utilizing the I/O interface shown in FIG. 2.

An exemplary data flow, shown in FIG. 3, that may be implemented on the input/output interface 14, begins by collecting a reset frame as indicated in block 42. This process may be accomplished by the capture module 34. In particular, the illustrated flow uses a first mode of the capture module 34. The capture module 34 may have any number of capture modes each of which perform a different function. Thus, the flow illustrated in FIG. 3 acquires data from the sensor 33 by initially collecting a reset frame 42.

The ALU module 36 is in a mode five that is a bypass mode wherein the module 36 is not utilized. Similarly, the pixel substitution module 38, in a mode two, is also bypassed. Thus, as indicated in block 44, the look up table module 40 is utilized to scale the pixel values of the reset or background noise image. The look up table module 40 may be in a mode one in accordance with one embodiment of the present invention. The output data is then stored in the RAM 30.

Thus, a variety of reprogrammable hardware units may be utilized in a particular mode to accomplish a given function. Other flows, in addition to the one shown in FIG. 3, may be ongoing at the same time as the illustrated flow and may use many of the same modules in different modes to achieve different results. In this way, a given module may be used variably and its mode assignment may be preprogrammed.

Figure 4:
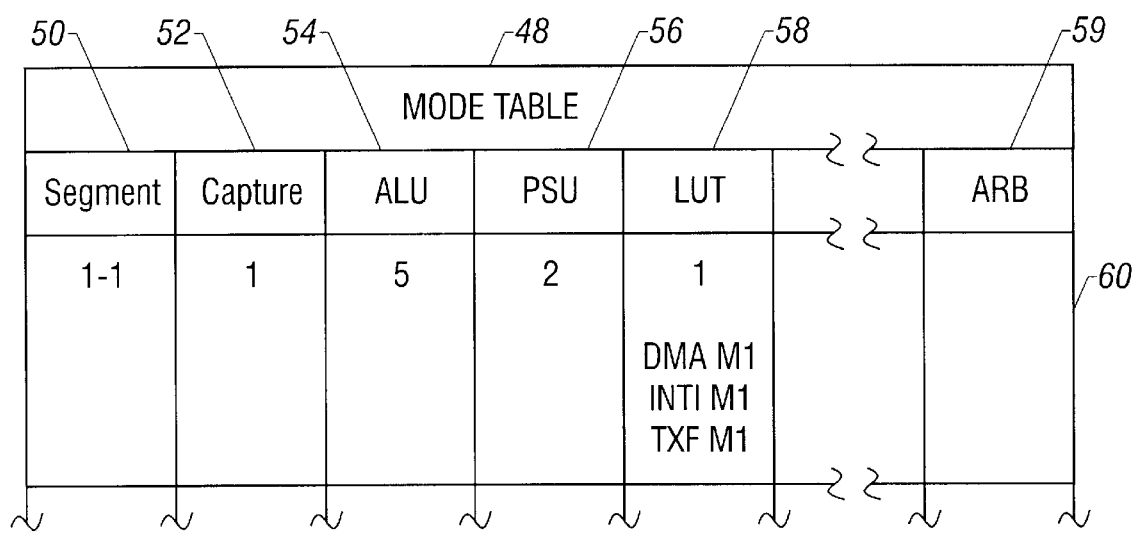
FIG. 4 shows a portion of a mode table in accordance with one embodiment of the present invention.

The preprogramming of a given data flow or segment such as the segment 1.1 illustrated in FIG. 3 may be accomplished through a mode table shown in FIG. 4. The mode table may be a table stored in the memory associated with the CPU 28 that sets the selected modes for each of a plurality of modules or hardware units involved in a given flow. Thus, the capture module 14 is illustrated as being in mode one, the ALU module 36 is in a mode five, the module 38 is in mode two and the LUT module 40 is in mode one for the flow shown in FIG. 3.

The information stored in the mode table is transferred by the CPU to the individual units or modules. In particular, command registers such as the registers 35–41 may be preset with desired operating characteristics such as the particular modes that are desired in a given data flow. Thus, the information in the mode table is transferred to the individual modules or units over the bus 12 to set the internal command registers for each mode of operation. The command registers in each unit or module monitor the bus 12 for information that relates to their units. When a command coded for its unit is identified, the command register causes the command to be stored in an appropriate register. Thus, each command may be identified with a transmit identifier (TXID) for a particular module or unit together with type information. The type information may identify whether the information is data, address, or command information, as a few examples.

The mode table may also provide additional information about the operation of the direct memory access engine 24, interrupt registers and FIFO registers. For example, as indicated under the entry "LUT" for the segment 1.1, a direct memory access (DMA) engine may be in mode one, an interrupt register may be in mode one and a transmit FIFO may be in mode one. The transmit FIFO is the FIFO 14b in FIG. 2, the DMA engine is the unit 24 and the interrupt register is a register associated with the CPU 28.

DMA mode one, for example, may be a write and a move (i.e., write progressively to addresses in the X direction). Other possible modes for the DMA include read, move in the X direction burst; read, move in the Y direction; write, move in the X direction; skip by one in the X direction; read, move in the X direction; skip by one in the X direction; skip by one in the Y direction and the like.

In one embodiment of the present invention, there may be seven DMA channels. Each of the channels may be in a different mode than other channels at any given time.

The DMA interrupt registers may have two modes in one embodiment. In a first mode, an interrupt may be on a write end and in the second mode an interrupt may be on a read end.

The transmit FIFO registers may have several modes in one embodiment of the present invention. For example, in one mode, the transmit FIFO registers transmit to two different units and monitor both for busy signals. Thus, for example, in FIGS. 3 and 4, the transmit FIFO registers are in a mode one. In this mode, the transmit FIFO registers fill in a unit identifier for the unit that will be receiving data from the transmit FIFO registers. The unit that will be receiving transmitted data is the RAM controller 26. Thus, the transmit FIFO 14b provides the transmit directions to transmit data to the RAM controller 26.

The mode table may also assign the highest bus access priority 59, as shown in FIG. 4. The highest priority for bus accesses is assigned to the LUT module 40 in the illustrated example.

Those skilled in the art will appreciate that a large number of segments each corresponding to different data flows may be produced in the mode table for any given complex process resulting in an ending result. Moreover, the number of hardware modules in the mode table may be much higher than the four modules illustrated. Thus, a large number of units or modules and a large number of segments may be operated in parallel and relatively independently of one another.

In some embodiments of the present invention, all the modules or units shown in FIG. 1 may be formed as one integrated circuit, potentially with the exception of the RAM 30 and the input/output unit 32. Within the one integrated circuit, bandwidth is necessarily abundant. While more than one bus may be utilized, one bus 12 may be utilized in some cases because the use of one bus allows easy reconfiguration of a plurality of units that may be readily configured together.

Figure 5:
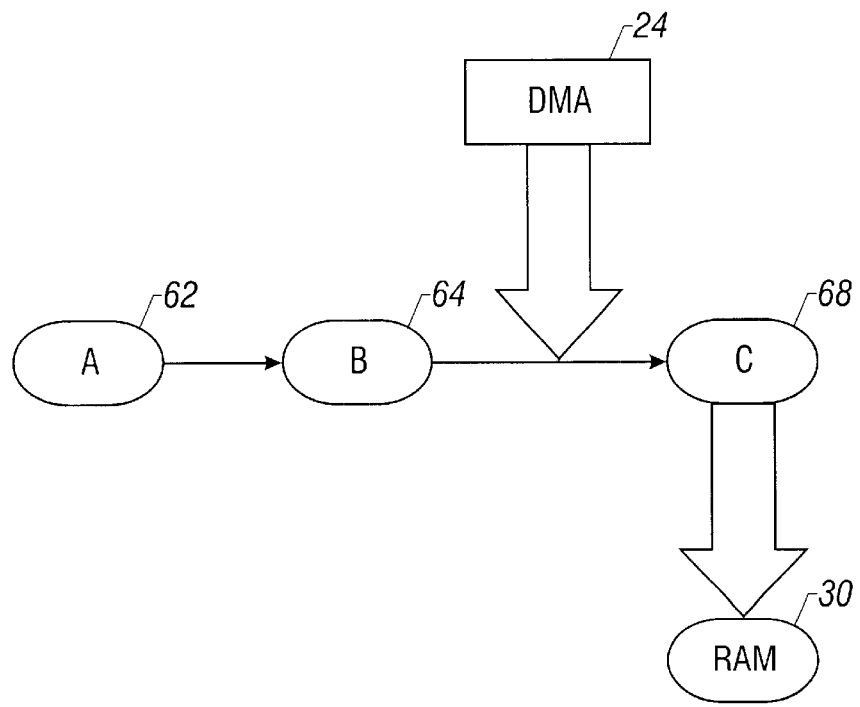
FIG. 5 is a schematic depiction of another data flow in accordance with one embodiment of the present invention.

Referring to FIG. 5, in a more complex data flow, utilizing a multi-stage pipe, the unit 62 is a data source (such as the cluster of a capture module 34 and a three color LUT 40).

The unit 64 may accomplish a general math function such as a multiply performed in a fixed function DSP. The final unit 68 is the RAM controller 26. When the unit 64 requests the bus 12, the DMA 24 recognizes the activity by looking at the bus grants and automatically generates the needed RAM address identified as an address signal on the bus 12. The DMA 24 channel was programmed with its instructions during the set up stage. Thus data may flow without addresses between units. When storage is involved, either for source data reads or destination data writes, an address may be required. The DMA controller 24 with its multiple channels may be used for automatic address generation. Thus, the RAM controller 26 receives the needed address to write to the RAM 30.

Figure 6:
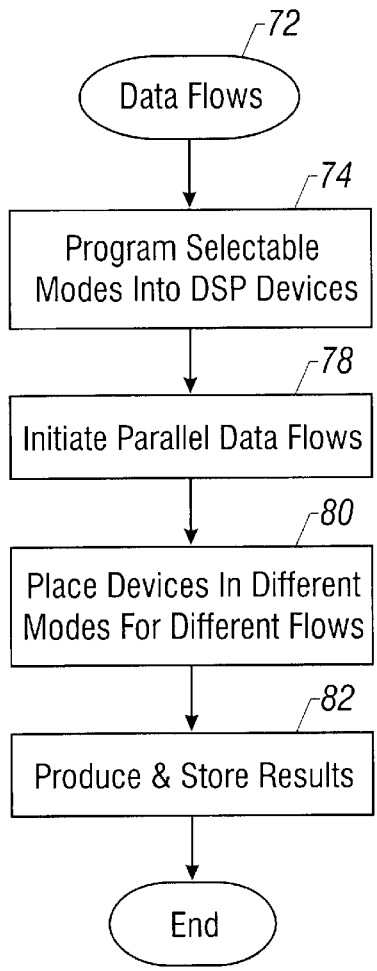
FIG. 6 is a flow chart for software in accordance with one embodiment of the present invention.

The data flow software 72, shown in FIG. 6 in accordance with one embodiment, begins by programming the various selected modes into two or more hardware or units such as any of the units 14–20 shown in FIG. 1, as indicated in block 74. Parallel, independent data flows are then initiated starting from input data or stored data as indicated in block 78. Generally, the parallel data flows may be initiated automatically upon the receipt of new data or under the control of CPU 28.

During a set up stage for each of the parallel data flows, the hardware units are placed in different modes for the different data flows as indicated in block 80. In this way, a given unit may selectively operate in different modes. As a result, the same hardware device may be effectively reconfigured on the fly and reused for different functions. Once all the data flows are complete, the results are produced and stored as indicated in block 82.

A device identification (ID) is used to communicate on the bus 12. Each transaction on the bus 12 has a transmit ID (TXID) that indicates where the cycle is going. Each unit that initiates a cycle on the bus 12 sends a TXID. Each unit that receives data from the bus responds to a specific TXID and captures the current cycle on the bus when there is a match between the TXID and a unit ID for that particular unit. A cycle may consist of an address and/or data and the TXID.

Each cycle on the DSP 10 may include address, command or data and may include type information as well. Again, the type information indicates whether the information is address, data, command or some other form of information. Flag information may be information that indicates the last address, in an x or y field for example, so the system knows when no more addresses will be forthcoming.

Thus, a variety of different types of information may be sent as packets along the same packetized bus. In some cases, it may be more desirable to have a separate bus for information that is time sensitive. For example, the arbiter 22 may operate with its own bus in one embodiment to the present invention. A cycle may also include flag information. A receiver ID (RXID) is also used. The bus 12 carries the return path for the originator of the current bus cycle. This return path is used only for posted reads as the RAM controller 26 needs to send the read data back at a later time to this ID.

Figure 9:
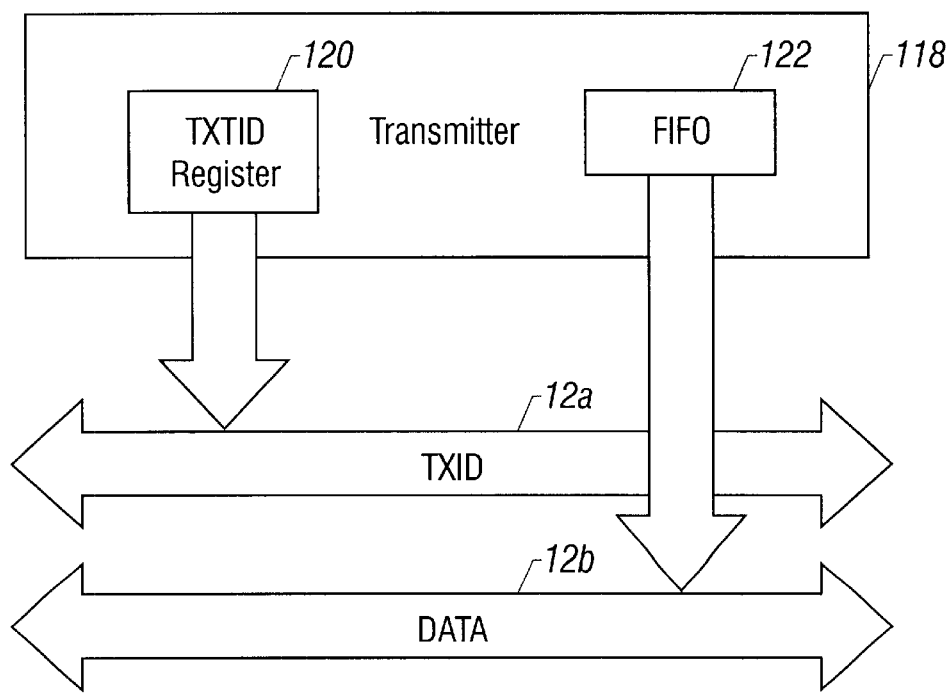
FIG. 9 is a transmitter in accordance with one embodiment of the present invention.

A unit or module transmitter 118, shown in FIG. 9, is responsible for requesting the bus 12, unloading its FIFO 122 and sending data to the proper place. To perform this function, the transmitter 118 has a TXTID register 120 to store the identifier (i.e., link) of the next module or unit in the flow where the data is to be sent. Thus, the TXTID is sent on the transmit identifier path 12a and the data, type and flags are transmitted from a FIFO 122 to the data path 12b.

Figure 10:
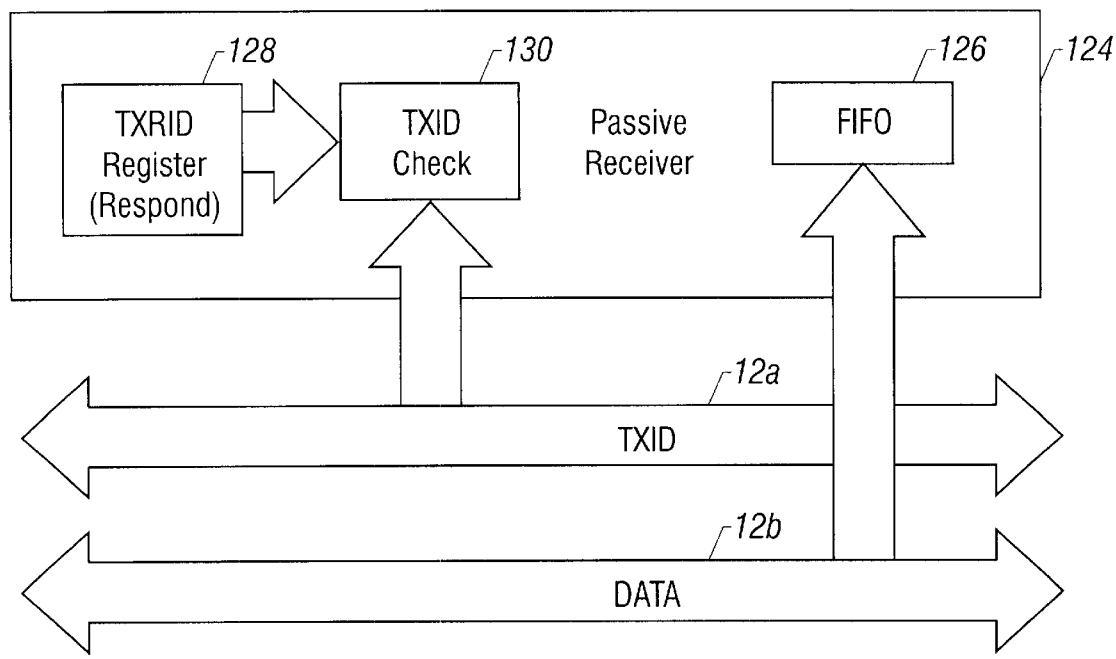
FIG. 10 is a passive receiver in accordance with one embodiment of the present invention.

A passive receiver 124, shown in FIG. 10, is responsible for receiving data commands or addresses on the bus 12. The FIFO 126 is loaded with this data in a final step. To perform the data receiving function, the receiver 124 has a TXRID register 128 to store the identifier to match the transmit identifier as indicated in block 130.

Figure 11:
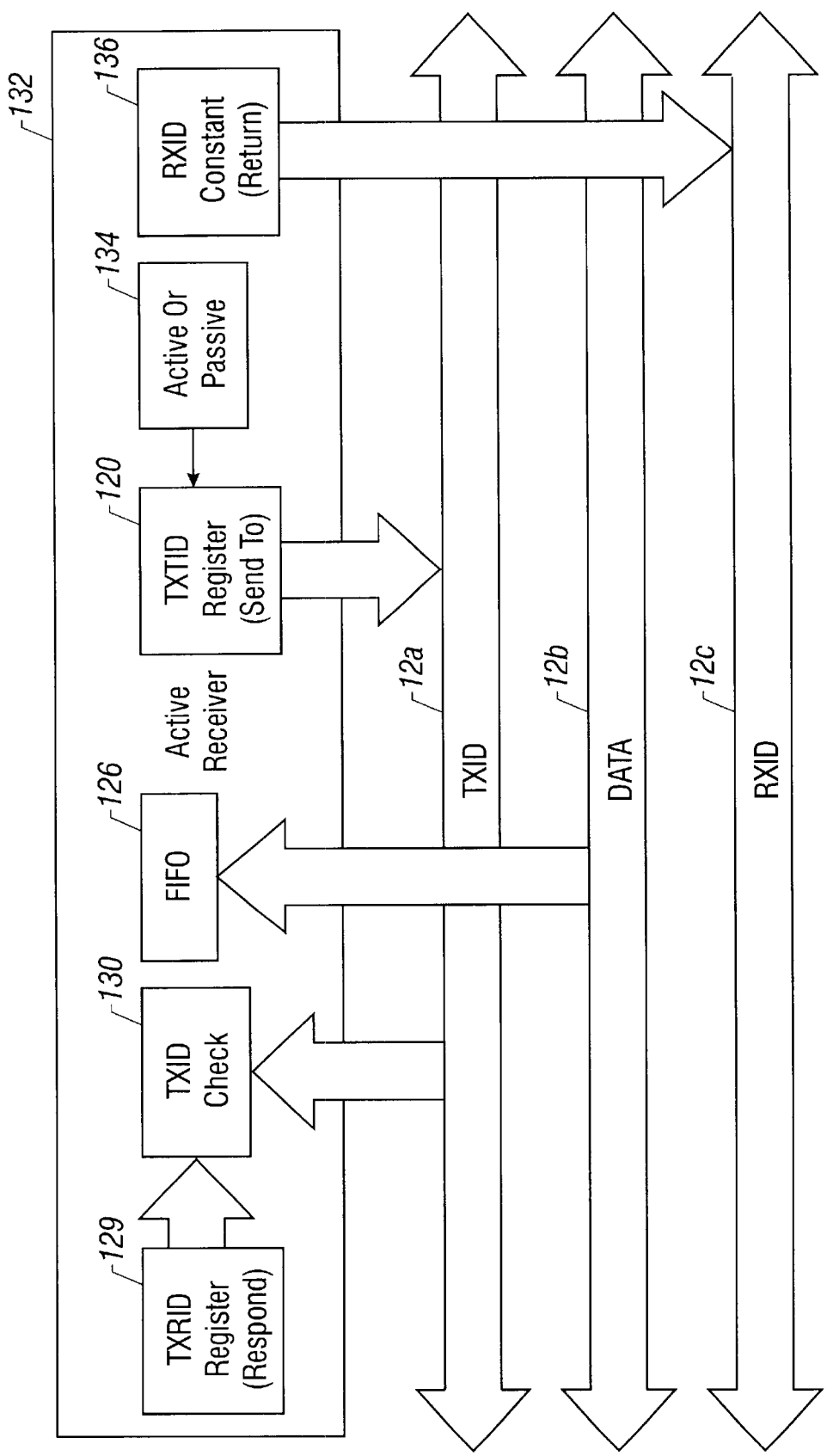
FIG. 11 is an active receiver in accordance with one embodiment of the present invention.

An active receiver 132, shown in FIG. 11, is programmed by the CPU 28 to initiate a memory read cycle. The receiver 132 waits for the posted read it initiated to create an inter-unit cycle on the bus 12 and receives data for its FIFO 126. To create the read cycle, the receiver 132 sends a request to a unit in its TXTID register 120 and the return ID is sent from the RXID register 136 along with the request. This active participation is set with a register bit in the register 134. If set as passive, the receiver 132 operates as a passive receiver. Since the active receiver is likely to be the first unit of the pipe, it may trigger the whole processing chain. A receiver identifier constant 129 is used to identify the return half of a split read transaction on the path 12a and b.

A busy state may be used to convey any receiver's full state back to a transmitter or active receiver. A separate busy signal bus may be the feedback path in the pipeline that allows a receiver to signal back to a transmitter when it is too full to receive more data. Each transmitter looks for the busy signal of the receiver it is sending to and prior to requesting the bus, checks to make sure the receiver's FIFO is not busy. The transmitter is able to identify the busy signals on the busy bus of interest based on TXIDs.

Figure 7:
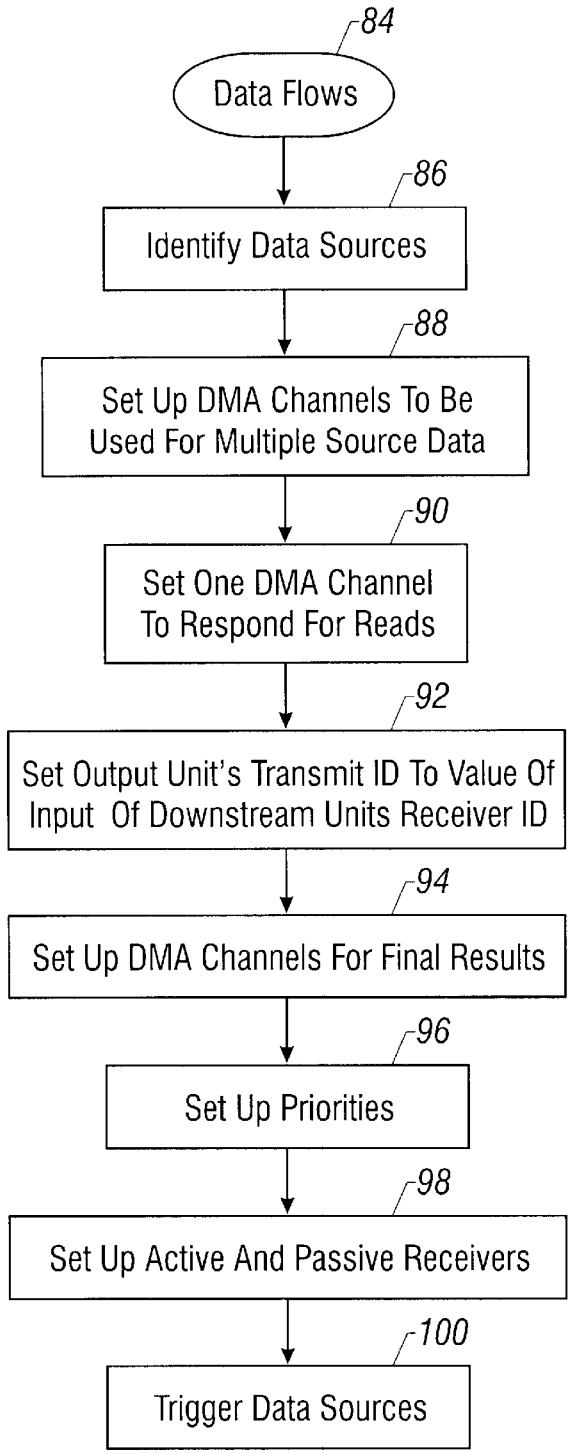
FIG. 7 is a more detailed flow chart for software for implementing the data flow processor shown in FIG. 1 in accordance with one embodiment of the present invention.

A more detailed version 84 of the data flow software, shown in FIG. 7, may be stored in association with the CPU 28. The stored flow begins by identifying the data sources as indicated in block 86. The data sources are the sources of data to be processed. Rectangular or two dimensional addresses to the RAM 30 as well as linear or one dimensional addresses to the RAM 30 are loaded into the DMA channels that are to be used for source data as indicated by block 88. Since in many cases the source data is in the form of a two dimensional array such as a pixel array, two dimensional addresses in the RAM 30 may be utilized in some embodiments of the present invention.

The units that are required to read the source data are then linked to the DMA channels by setting one DMA channel to correspond to a given unit's identifier as indicated in block 90. In other words, each of the units is assigned a unit identification in a bus grant in response to a bus request. Thus, the DMA channels may be programmed during the set up stage to automatically provide the memory addresses shortly following a read request to the RAM controller 26.

Connections between the various units shown in FIG. 1 are made by the CPU 28 during the setup stage by setting the output unit's transmit identifier (TXID) equal to the value of the downstream unit's receiver identifier (RXID), as indicated in block 92. A unit that stores the final results in memory may then be linked to a DMA channel. When the last unit performs a write, the DMA channel address is attached to the write command as the write command is sent over the bus 12 to the RAM controller 26, as indicated in block 94. A DMA to unit link is established by configuring a DMA channel to belong to a certain output stage of a unit. The DMA channel monitors the bus grants from the arbiter 22 to make the match.

The various bus priorities are then set up in the registers 23 of the arbiter 22 as indicated in block 96. The bus access priority is generally set so that the last data flow segment step has the highest priority and the second to the last step is the second to highest priority, and so on. This assures that there will be no blockage in the pipe, which might cause the system to fail.

If required, interrupts are set up in the DMA controller 24 such that on the end of the last write of the processed data, the CPU 28 is interrupted. The DMA controller 24 monitors the data bus tag fields such as end of field in the x direction (EOX) or the end of field of the of the y direction (EOY), in a two dimensional data field such as a pixel array. Thus the DMA controller 24 looks for an EOX and EOY defining the last data or the last pixel. The end of the field in the x direction corresponds to the end of the row and the end of the field in the y direction corresponds to the end of the column and the end of the entire field in one embodiment of the present invention. The CPU 28 also has the option to poll the DMA registers to monitor progress.

The EOX and EOY are set by the CPU 28 during the initiation of a data flow. The DMA engine 24 is the only unit that knows when all the addresses are done. It is the DMA engine 24 that attaches EOX and EOY tags at the end of a data field.

The receiving FIFO registers of the receiving units are set up to be active or passive receivers as indicated in block 98. Only one active receiver is needed for the beginning of each data flow. The other receiving FIFO registers of other units may be passive.

Finally, the data sources are triggered. This triggers the first unit in a data flow to begin processing. Each unit capable of being the first unit has a specific register to designate that unit to respond to the source data trigger. In order to trigger the unit, an active bit in its receive FIFO registers is set as indicated in block 100.

Figure 8:
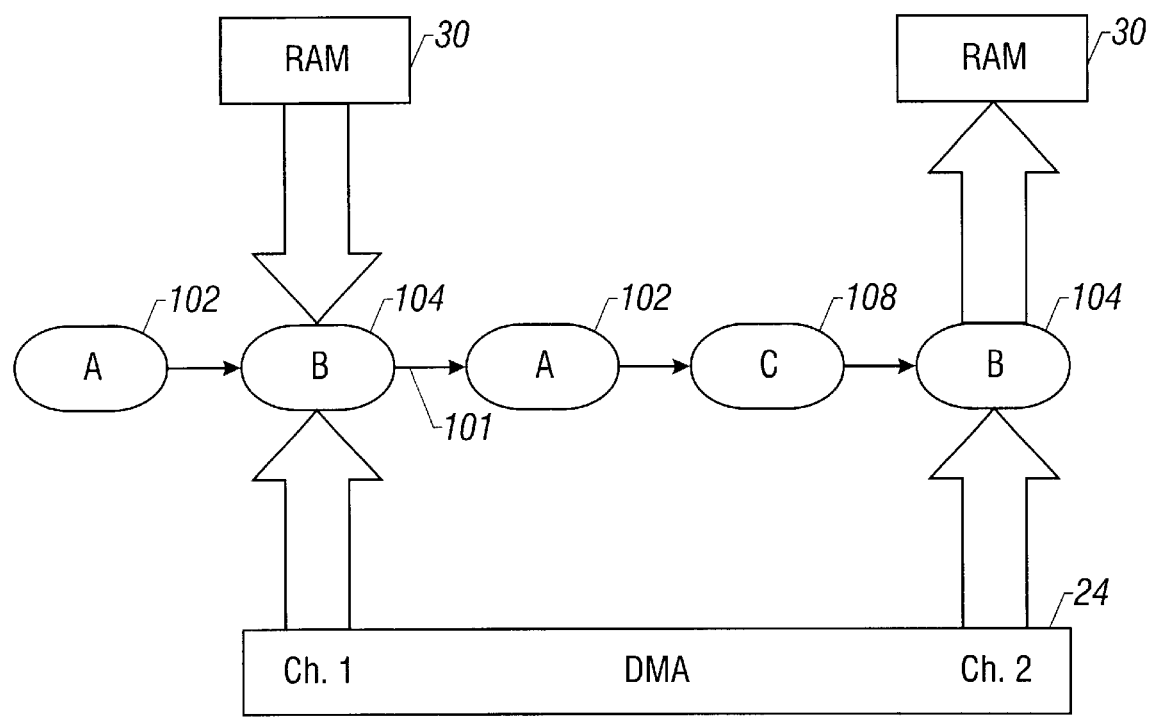
FIG. 8 is still another depiction of a data flow in accordance with one embodiment of the present invention.

Referring to FIG. 8, an example of another data flow involves two DSP units 102 and 108 and memory controller 104 coupled in series. The flow begins when the active receiver of the unit 102 requests data be read from the device 104 which may be the RAM controller 26 coupled to the RAM 30. The DMA controller 24 supplies an address over one of its two illustrated DMA channels (channels one and two). For example, channel one of the DMA controller 24 may be assigned to a process implemented by the unit 104.

When the read has occurred, the data flow begins. The device 104 then sends the data to the device 102 (as indicated by the arrow 101) that made the original request, which then transfers the data onto the device 108. Assuming unit 104 (the RAM controller 26 for example) accomplishes the last step, the data is written back to the storage 30 using DMA channel two for address creation.

The unit 102 negotiated for the read to take place and the device 104 performed the read offline from the buses' perspective (i.e., for a posted read or split cycle). When the read data was ready, the unit 102 requested the bus to deliver the data to the unit 102.

In the example illustrated in FIG. 8, two sources of information (data/address) merge to become one at unit 104. It is also an example of two units (units 102 and 108) feeding off of one data source. The trigger elements must be determined. That is, the device that is begin the flow must be set. In the case of capture and ALU modules, the capture may be the overriding process that determines the pace of the data flow, and the ALU simply keeps pace. For this case, it is advantageous to trigger both modules, one after the other, with the ALU triggered first since it is a slave. On the other end of the pipe, the module receiving the data listens in on the same channel.

Figure 12:
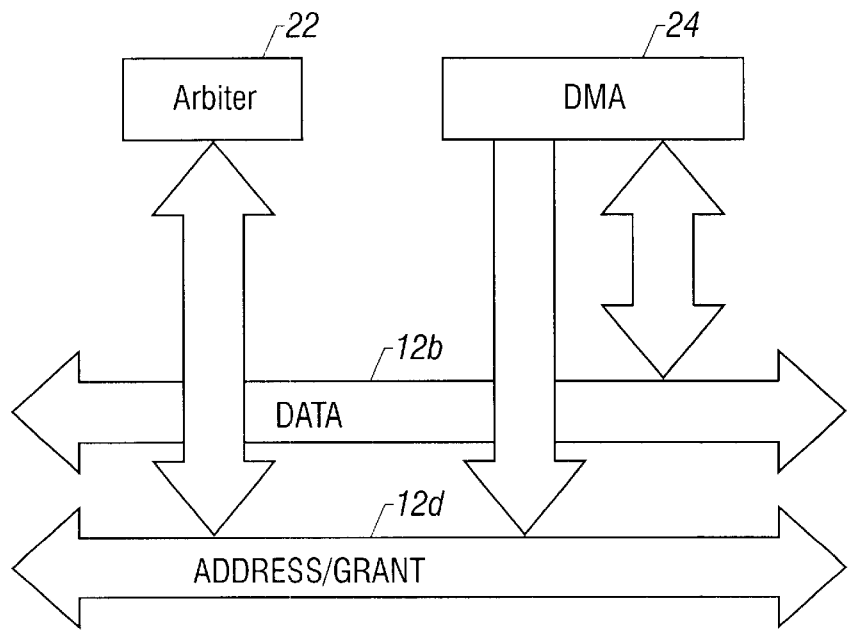
FIG. 12 shows how the arbiter and the DMA engine communicate with the bus in one embodiment of the present invention.

Referring to FIG. 12, data and address/grant information may be sent over the same packet bus 12 using an arbiter 22 which communicates with the address/grant bus 12d. The address/grant bus 12d within the overall bus 12 provides for given units or modules to request access to the bus 12 and for the arbiter 22 to grant that access, as appropriate based on the unit's priority and the current requests for the bus by other units. At the same time, the DMA engine 24 also accesses the address/grant bus 12d so that it can determine when any given unit is seeking data from memory. The DMA engine 24 normally communicates over the data bus 12b. In other embodiments of the present invention, the address/grant information may be packetized with the other data.

A series of data flows may operate relatively independently of one another and in parallel. After an initial set up phase, a given flow may be implemented that begins with a read, involves a series of process steps and ends in a write. In each case, any number of these data flows may be operating at the same time. In some cases, these data flows may use the same hardware units at indeterminant times. Flow control may be achieved simply by feedback to the various units from the flow. When the data units are busy, the data flow awaiting access to a unit simply awaits the removal of the unit's busy flag. The data flows may progress without constantly seeking data from a central memory. Instead, data may be read at the beginning of a data flow and written at the end of the data flow. Within the data flow, the data may be simply carried with the data flow without requiring any kind of addressing mechanism.

Because the data flows may progress relatively independently of memory accesses, a much more flexible operation is achieved. In particular, reducing the number of memory accesses may increase the speed of operation of some embodiments of the present invention. Likewise, it may decrease the power consumption in some embodiments of the present invention. Moreover, by reducing the need to constantly return to the memory for data, multi-dimensional data structures may be constructed from uni-dimensional memories. Thus, a memory address structure with two dimensions may be utilized which corresponds to the data structure from an imaging array as one example. In addition, a three dimensional data structure may be utilized to represent a three dimensional structure. These multi-dimensional data structures facilitate the operation of the individual units or modules.

While the present invention has been described as operating in a data flow mode, the present invention is also applicable to embodiments in which data flow processors are incorporated into non-data flow processor-based system, such as conventional, sequentially controlled processor-based systems. For example, in one embodiment to the present invention, a data flow processor of the type described herein may be utilized to implement a graphics accelerator coupled to an accelerated graphics port (AGP) bus. The graphics accelerator may have a plurality of modules that work together as a data flow processor. In addition, the graphics accelerator may communicate with system memory through data flow processing. The use of data flows to manipulate complex graphics data may be more efficient than conventional systems in some embodiments. Reducing the need to access the memory may increase the speed of operation. Thus, a graphics accelerator may operate in whole or in part as a data flow processor within a conventional, sequentially operated computer system.

In addition, the present invention may utilize a programming model, in some embodiments of the present invention, that facilitates the design of complex data handling systems.

Initially, a graphical depiction of the type shown in FIG. 3 may be developed that captures the various operations that must be implemented in software and hardware. The needed modules or units are identified and the modes of those units are recorded in a mode table as illustrated in FIG. 4. At this point, the desired characteristics may be transferred from the CPU 28 into command registers, such as the registers 35–41, in the various modules or units during a setup stage. In this way, distinct operations, graphically depicted and set up in a mode table may be mapped into hardware units without the need to use real time operating systems or the like.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   programming at least two selectable functional modes for each of two reprogrammable digital signal processing devices; and
   initiating at least two independent data flows for each of said devices, such that each of said flows use a different mode of at least one of said devices.

2. The method of claim 1 including identifying a source of data to begin each data flow.

3. The method of claim 1 including providing the data before initiating the flow.

4. The method of claim 1 including accessing data in a random access memory and loading said data into channels to be utilized as source data.

5. The method of claim 4 including enabling said devices to directly access source data.

6. The method of claim 5 including providing a direct memory access controller and assigning a plurality of channels to provide source data for said flows.

7. The method of claim 6 including assigning one of said direct memory access channels to respond to read requests from one of said devices.

8. The method of claim 6 including providing a designated direct memory access channel for the final result of a data flow.

9. The method of claim 1 including coupling said devices together through a common bus.

10. The method of claim 9 including coupling said devices together over a packet bus.

11. The method of claim 10 including providing device identifiers for devices on said bus and setting the output of one of said devices to the device identifier for the other of said devices.

12. The method of claim 9 including providing an arbiter that is assigns priorities for accessing said bus.

13. The method of claim 12 including assigning the bus access priorities before initiating said at least two independent data flows.

14. The method of claim 1 including designating each of said devices to either send, receive or send and receive data.

15. The method of claim 1 including receiving a string of memory addresses, and converting those addresses into a data structure having at least two dimensions.

16. The method of claim 15 including forming a data structure having at least three dimensions and using said data structure to model a three-dimensional object.

17. A method of claim 15 including converting a one dimensional data structure from a memory into a data structure having at least two dimensions for use by said devices and writing data back to said memory as a one dimensional data structure.

18. An article comprising a medium storing instructions that cause a processor-based system to:
   program at least two selectable functional modes for each of two reprogrammable digital signal processing devices; and
   initiate at least two independent data flows for each of said devices, such that each of said flows use a different mode of at least one of said devices.

19. The article of claim 18 wherein said processor-based system identifies a source of data to begin each data flow.

20. The article of claim 18 further storing instructions that cause a processor-based system to provide the data before initiating the flow.

21. The article of claim 18 further storing instructions that cause a processor-based system to access data in a random access memory and load said data into channels to be utilized as source data.

22. The article of claim 21 further storing instructions that cause a processor-based system to assign a plurality of direct memory access channels to provide source data for said flows.

23. The article of claim 21 further storing instructions that cause said processor-based system to convert a string of memory addresses into a data structure having at least two dimensions.

24. The article of claim 23 further storing instructions that cause a processor-based system to form a data structure having at least three dimensions and use said data structure to model a three dimensional object.

25. The article of claim 23 further storing instructions that cause a processor-based system to convert a one dimensional data structure from a memory into a data structure having at least two dimensions for use by said devices and to cause said data to be written back to said memory as a one dimensional data structure.

\* \* \* \* \*